United States Patent [19]
Yahagi et al.

[11] Patent Number: 5,971,403
[45] Date of Patent: Oct. 26, 1999

[54] HOLDING DEVICE FOR PERCUSSION TOOL

[75] Inventors: Akihisa Yahagi; Mutsuo Harada, both of Hitachinaka, Japan

[73] Assignee: Hitachi Koko Co., Ltd., Japan

[21] Appl. No.: 08/988,355

[22] Filed: Dec. 10, 1997

[30] Foreign Application Priority Data

Dec. 13, 1996 [JP] Japan .................................. 8-334068
Sep. 26, 1997 [JP] Japan .................................. 9-261987

[51] Int. Cl.$^6$ ...................................................... B23B 5/22
[52] U.S. Cl. .......................... 279/19.3; 279/19.5; 279/75; 279/82; 279/905
[58] Field of Search .......................... 279/19, 19.3, 19.4, 279/19.5, 74, 75, 71, 81, 82, 904, 905

[56] References Cited

U.S. PATENT DOCUMENTS 4,691,929  9/1987  Neumaier et al. ...................... 279/19.3
5,199,833  4/1993  Fehrle et al. ........................... 279/19.3

FOREIGN PATENT DOCUMENTS

3516541 A1  11/1986  Germany ................................ 279/19
2276578     10/1994  United Kingdom .
2276579     10/1994  United Kingdom .

*Primary Examiner*—Daniel W. Howell
*Assistant Examiner*—Monica Smith
*Attorney, Agent, or Firm*—Parkhurst & Wendel, L.L.P.

[57] ABSTRACT

A tool bit holding device for use in percussion apparatuses such as electrically operated hammers is provided. The device includes a tool bit carrier, a front hand-operated grip, and a rear hand-operated grip. The front hand-operated grip is supported by the tool bit carrier so as to be movable in a lengthwise direction and a circumferential direction of the tool bit carrier. The rear hand-operated grip is installed rotatably on a hollow cylinder connected to a casing of the hammer. The removable of a tool bit from the tool bit carrier is accomplished by moving the front grip in the lengthwise direction and then turning it in the circumferential direction to release engagement between the tool bit and the tool bit carrier. The angular orientation of the tool bit carrier relative to the casing of the hammer is accomplished by turning the rear grip relative to the tool bit carrier to shift a angular relation between the tool bit carrier and the casing of the hammer.

9 Claims, 6 Drawing Sheets

HOLDING DEVICE FOR PERCUSSION TOOL

BACKGROUND OF THE INVENTION

1. Technical Field of the Invention

The present invention relates generally to a tool holding device for a percussion tool bit such as a cutter, a chisel, or a scoop used in, for example, electrically operated hammers, and more particularly to an improved structure of a tool holding device designed to provide for ease end safety of operations.

2. Background of Related Art

UK Patent Application GB-A-2 276 578 and UK Patent GB-B-2 276 579 disclose tool holding devices for use in electrically operated hammers. The tool holding devices include a tool bit carrier designed to hold a tool bit by engagement of locking members with grooves formed in the tool bit. The removal of the tool bit from the tool bit carrier is allowed by moving a front grip in an axial direction of the device to release the engagement of the locking members with the grooves of the tool bit.

The angular orientation of the tool bit relative to a body of the hammer is achieved by adjusting the angular position of the tool bit carrier relative to the body of the hammer since the angular relation between the tool bit and the tool bit carrier is fixed. The angular position of the tool bit carrier relative to the body of the hammer is held by engagement of steel balls mounted in a retainer sleeve connected to the body of the hammer with grooves formed in the tool bit carrier. The adjustment of the angular position of the tool bit carrier is achieved by moving a rear grip in the axial direction against a spring pressure to allow the engagement of the steel balls with the grooves to be released and turning the retainer sleeve to bring the steel balls into engagement with the other grooves.

The above conventional tool holding devices, however, have the following drawbacks.

The removal of the tool bit is, as described above, allowed by moving the front grip in the axial direction of the device to release the engagement of the locking members with the grooves of the tool bit, but the front grip may be moved accidentally to dislodge the tool bit by, for example, collision of the front grip with a work piece when the operator drills the work piece within a narrow work envelope or by the impact transmitted to the tool bit when the operator uses the hammer while holding the front grip.

Further, in order to adjust the angular position of the tool bit carrier relative to the body of the hammer, it is, as described above, necessary for the operator to take two actions, in sequence, of axially moving and turning the rear grip, but this Is quite inconvenience.

SUMMARY OF THE INVENTION

It is therefore a principal object of the present invention to avoid the disadvantages of the prior art.

It is another object of the present invention to provide a holding device for a percussion tool designed to improve ease end safety of operations.

According to one aspect of the present invention, there is provided a holding device for holding a tool bit for use in a percussion apparatus which comprises: (a) a tool bit carrier made of a hollow cylindrical member having a given length for carrying the tool bit therein along the length, the tool bit carrier having formed in a side wall thereof at least one opening; (b) at least one locking member disposed within the opening of the tool bit carrier; (c) a first locking member holder movable between a first holding position and a first release position in a lengthwise direction of the tool bit carrier, in the first holding position, the first locking member holder engaging a first portion of the locking member to establish engagement of the locking member with a groove formed in the tool bit for locking the tool bit in the tool bit carrier, in the first release position, the first locking member holder being placed out of engagement with the first portion of the locking member; (d) a second locking member holder movable between a second holding position and a second release position in a circumferential direction of the tool bit carrier, in the second holding position, the second locking member holder engaging a second portion of the locking member to establish engagement of the locking member with the groove of the tool bit for locking the tool bit in the tool bit carrier, in the second release position, the second locking member holder being placed out of engagement with the second portion of the locking member; and (e) a hollow cylindrical grip provided around the tool bit carrier, connected to the first and second locking member holders, the hollow cylindrical grip being movable both in the lengthwise direction and in the circumferential direction of the tool bit carrier, movement in the lengthwise direction causing the first locking member holder to be moved from the first holding position to the first release position, movement in the circumferential direction causing the second locking member holder to be moved from the first holding position to the second release position, when the first and second locking member holders are placed in the first and second release positions, respectively, it will cause the engagement of the locking member with the groove of the tool bit to be released.

In the preferred mode of the invention, the second locking member holder is disposed so as to surround a peripheral surface of the tool bit carrier and made of a hollow cylinder having formed on an end thereof a first tapered surface and a second tapered surface continuing from the first tapered surface. In the second holding position, the second locking member holder is placed in engagement of the first tapered surface with the second portion of the locking member to establish the engagement of the locking member with the groove of the tool bit. In the second release position, the second locking member holder is placed in engagement of the second tapered surface with the second portion of the locking member to release the engagement of the locking member with the groove of the tool bit.

The first tapered surface of the second locking member holder projects from the second tapered surface in a direction perpendicular to the second tapered surface.

A spring is further provided which urges the first locking member holder into the first holding position.

The holding device further comprises: (f) a hollow cylindrical supporting member connected to the percussion apparatus, supporting therein an end portion of the tool bit carrier rotatably; (g) a plurality of recesses formed in a circumferential surface of the end portion of the tool bit carrier at given angular intervals; (h) at least one opening formed in a side wall of the hollow cylindrical supporting member in coincidence with one of the recesses; (i) a second locking member disposed within the opening; (j) a hollow cylindrical holder having formed on an inner wall a cam surface including a first and second section, the hollow cylindrical holder being supported on the hollow cylindrical supporting member rotatably so as to be movable between a first and second angular position, in the first angular position, the first section of the cam surface lying in engagement with the second locking member to bring the second locking member into constant engagement with first one of the recesses to determine a first angular relation between the tool bit carrier and the hollow cylindrical supporting member, in the second angular position, the second section of the cam surface defining a chamber within which the second locking member is allowed to be moved out of engagement with the one of the recesses; and (k) a rotating means for rotating the tool bit carrier relative to the hollow cylindrical supporting member according to movement of the hollow cylindrical holder from the first angular position to the second angular position to bring second one of the recesses adjacent the first one into coincidence with the second locking member for establishing a second angular relation between the tool bit carrier and the hollow cylindrical supporting member.

According to another aspect of the present invention, there ms provided a holding device for holding a tool bit for use in a percussion apparatus which comprises: (a) a tool bit carrier made of a hollow cylindrical member for carrying the tool bit therein; (b) a hollow cylindrical supporting member connected to the percussion apparatus, supporting therein an end portion of the tool bit carrier rotatably; (c) a plurality of recesses formed in a circumferential surface of the end portion of the tool bit carrier at given angular intervals; (d) at least one opening formed in a side wall of the hollow cylindrical supporting member in coincidence with one of the recesses; (e) at least one locking member disposed within the opening; (f) a hollow cylindrical holder having formed on an inner wall a cam surface including a first and second section, the hollow cylindrical holder being supported on the hollow cylindrical supporting member rotatably so as to be movable between a first and second angular position, in the first angular position, the first section of the cam surface lying in engagement with the locking member to bring the locking member into constant engagement with first one of the recesses to determine a first angular relation between the tool bit carrier and the hollow cylindrical supporting member, in the second angular position, the second section of the cam surface defining a chamber within which the locking member is allowed to be moved out of engagement with the one of the recesses; and (g) a rotating means for rotating the tool bit carrier relative to the hollow cylindrical supporting member according to movement of the hollow cylindrical holder from the first angular position to the second angular position to bring second one of the recesses adjacent the first one into coincidence with the locking member for establishing a second angular relation between the tool bit carrier and the hollow cylindrical supporting member.

In the preferred mode of the invention, the rotating means includes a spring connected at one end to the tool bit carrier and wound at the other end around the hollow cylindrical holder. The spring transmits torsion, produced by the movement of the hollow cylindrical holder from the first angular position to the second angular position, to the tool bit carrier.

A hand-operated grip is further provided which is made of a hollow cylinder having disposed therein the hollow cylindrical holder. The hand-operated grip is connected to the hollow cylindrical holder so as to be rotatable together.

The holding device further comprises a second spring producing a spring pressure according to the movement of the hollow cylindrical holder from the first angular position to the second angular position to urge the hollow cylindrical holder in a direction opposite the movement thereof.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
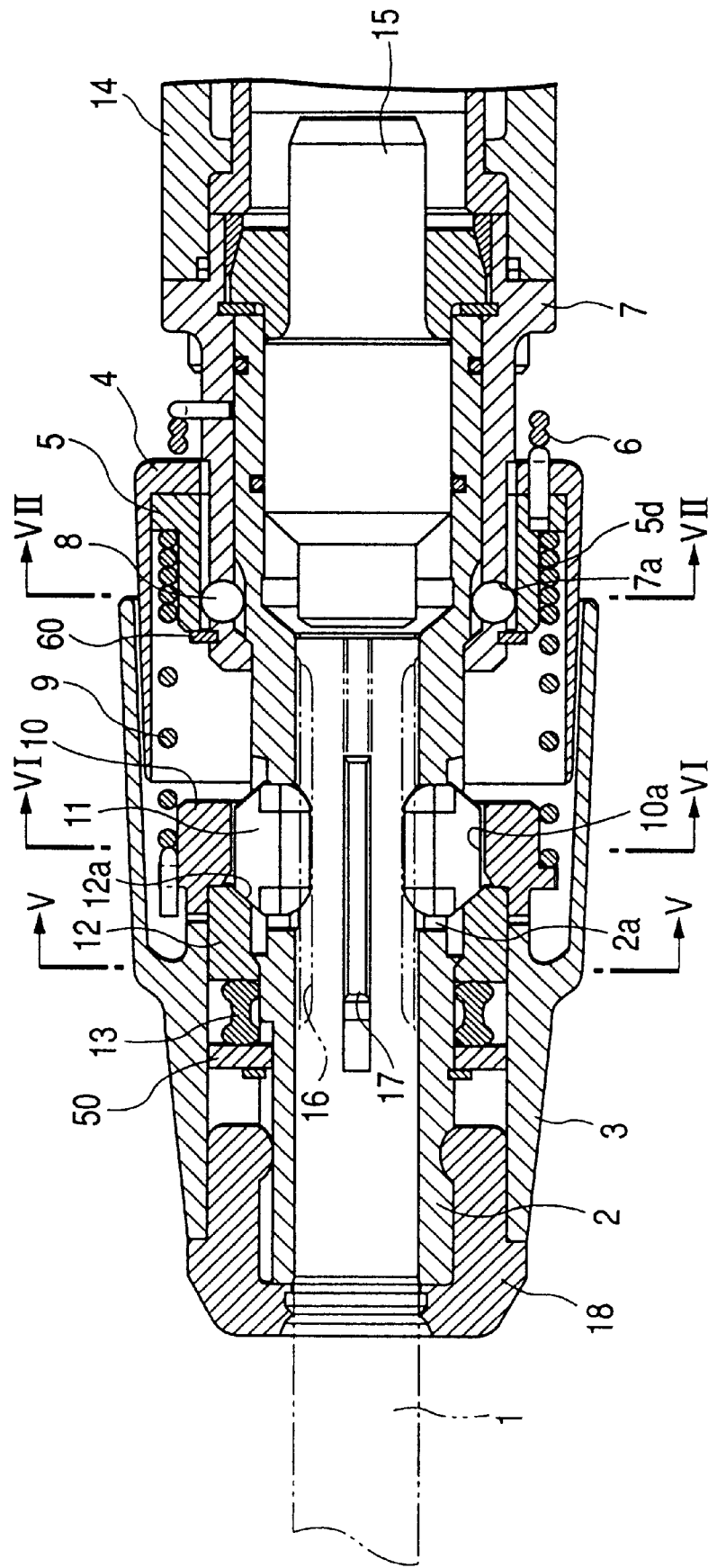
FIG. 1 is a longitudinal cross sectional view which shows a holding device for holding a tool bit according to the present invention.

Referring now to the drawings, particularly to FIG. 1, there ms shown a tool holding device for a percussion tool bit according to the invention.

The tool holding device generally includes the retainer sleeve 2 (i.e., tool bit carrier), and the first and second hand-operated grips 3 and 4. The retainer sleeve 2 is connected to the hammer casing 14 through the front cover 7. The hammer casing 14 is connected to a percussion device (not shown) such as an electrically operated hammer. The impact produced by an impact producing mechanism of the percussion device ms transmitted to a rear end of the tool bit 1 through the striker 15. The tool bit 1 is of a known construction such as one disclosed in the above discussed UK patent application GB-A-2 276 578 and has formed in the periphery thereof two diametrically-opposed closed grooves 16 and a plurality of torque transmitting grooves 17. The tool bit 1 is held et the rear end thereof within the retainer sleeve 2. The retainer sleeve 2 has formed therein two holes 2a in which two locking members 11 are disposed to be movable in directions perpendicular to the length of the retainer sleeve 2. The locking members 11 are held by inner walls 10a (hereinafter, referred to as stopper walls) of the first locking member holder 10, as shown in FIG. 6, and the chamfered or tapered end 12a of the second locking member holder 12 in constant engagement with the grooves 16 of the tool bit 1 for locking the tool bit 1 in the retainer sleeve 2.

The first locking member holder 10 is made of a hollow cylindrical member and bonded to the first grip 3. The first coil spring 9 is attached et one end thereof to the periphery of the first locking member holder 10 and wound at the other end around the outer surface 5d of the ball holder 5 to urge the first locking member holder 10 in the left direction, as viewed in FIG. 1, into constant engagement with the locking members 11. The first grip 3 is secured rotatably around the retainer sleeve 2 through the end cap 18 installed on an end of the retainer sleeve 2. The ball holder 5 is supported on the front cover 7 along with the second grip 4 and held by the washer 60 from moving in the axial direction.

Figure 2:
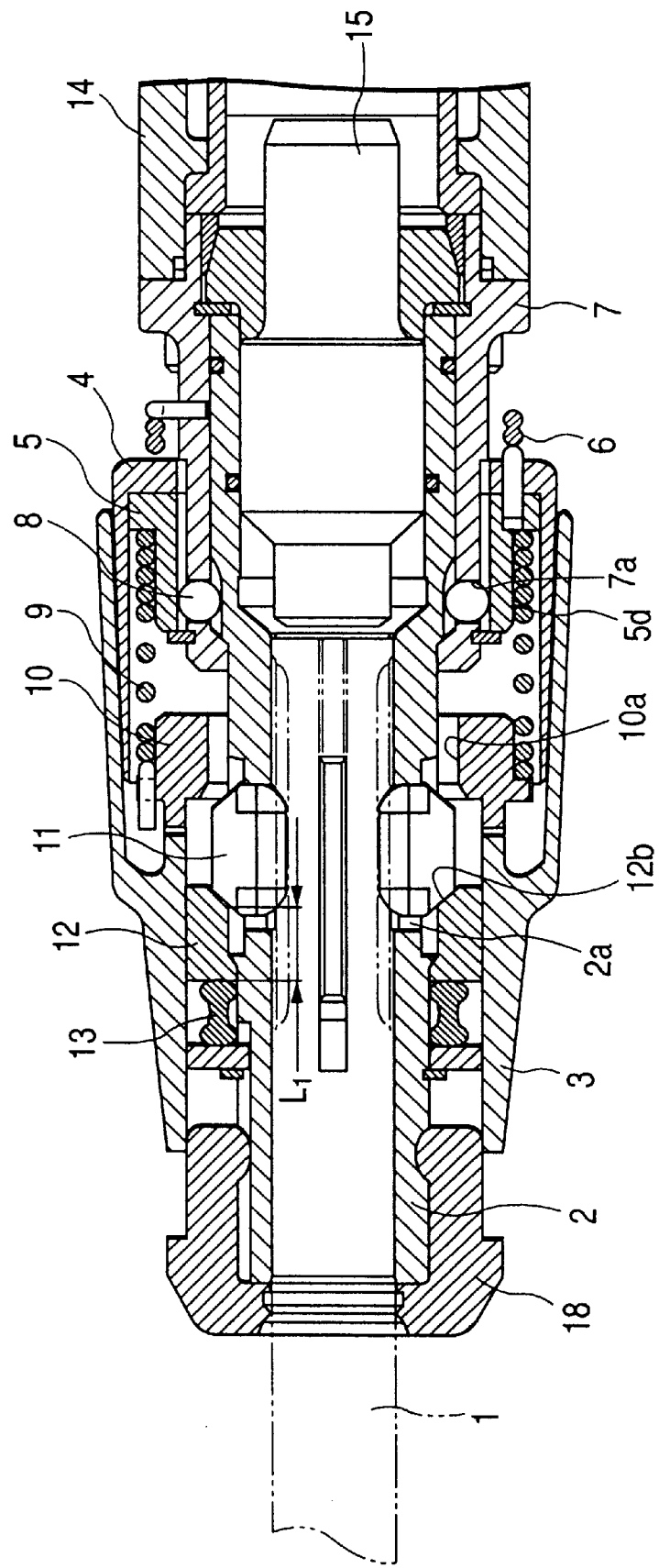
FIG. 2 is a longitudinal cross sectional view which shows a holding device when a first grip is moved in an axial direction of the device.
Figure 3:
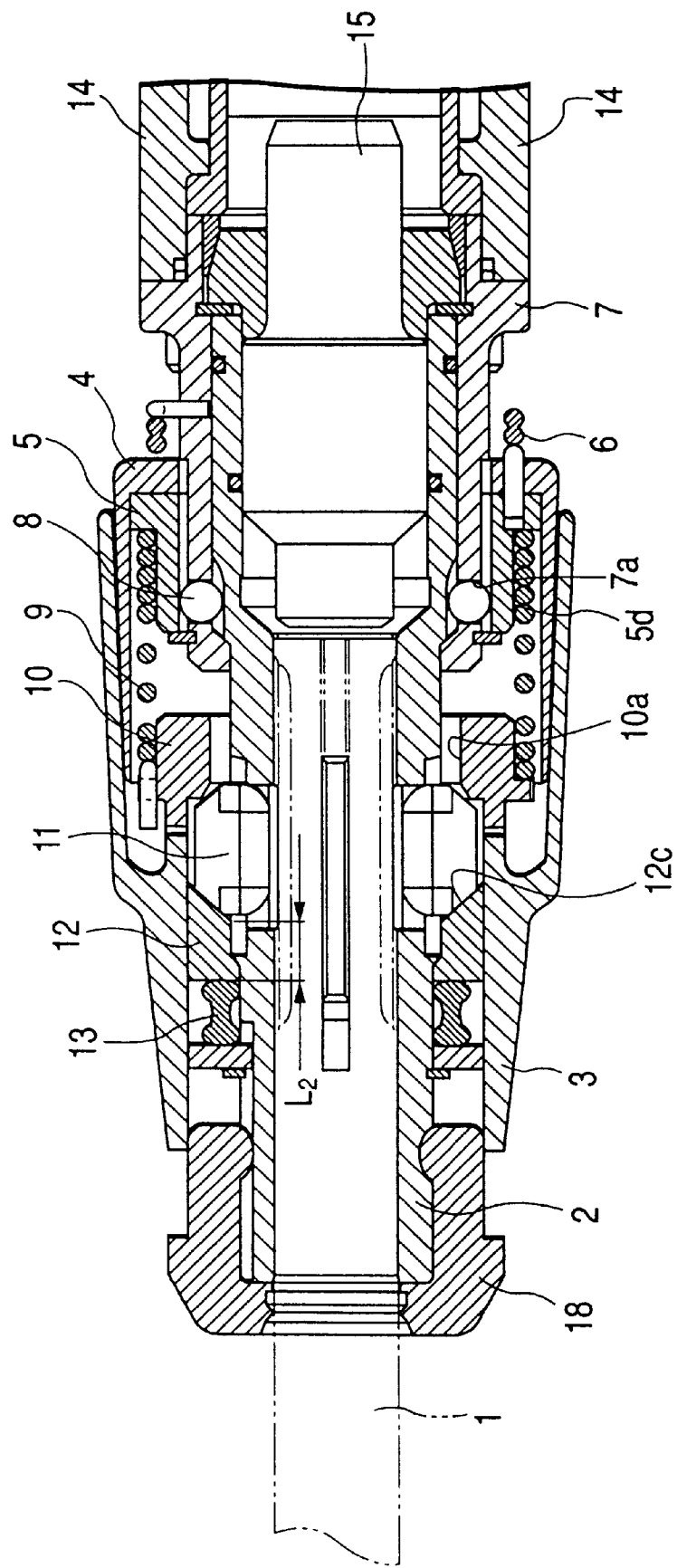
FIG. 3 is a longitudinal cross sectional view which shows a holding device when a first grip is moved in a circumferential direction of the device from the position, as shown in FIG. 2.
Figure 6:
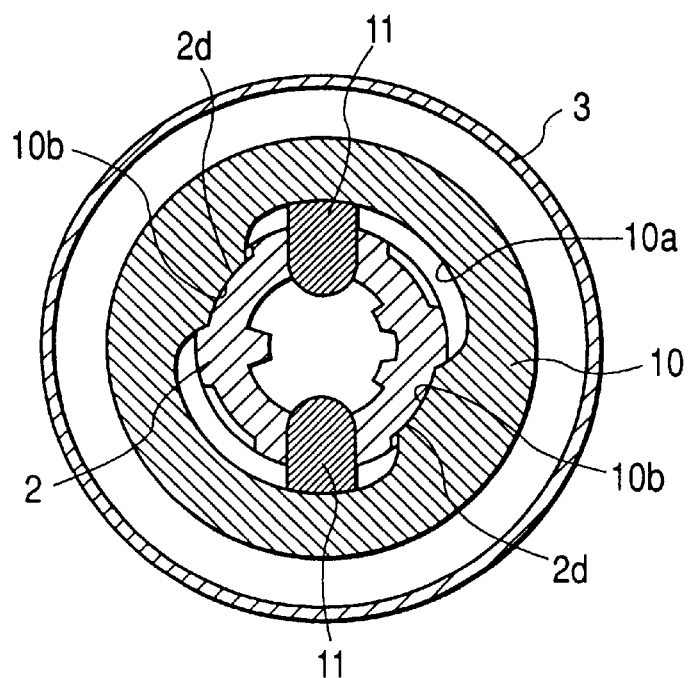
FIG. 6 is a traverse cross sectional view taken along the line VI—VI in FIG. 1.

The first locking member holder 10, as clearly shown in FIG. 6, has the stopper walls 10a and protrusions 10b. The stopper walls 10a, as discussed above, restrict the movement of the locking members 11 in radial directions of the retainer sleeve 2. The protrusions 10b engage the grooves 2d formed in an outer surface of the retainer sleeve 2. Each of the groove 2d is of L-shape end includes a longitudinal section extending in the lengthwise direction of the retainer sleeve 2 and a lateral section extending in the circumferential direction of the retainer sleeve 2. In FIG. 1, the protrusions 10b engage the longitudinal sections of the grooves 2d, respectively, to hold the first grip 3 from rotating in the circumferential direction of the retainer sleeve 2. When the first grip 3 is moved or pulled to the right as shown in FIG. 2, the protrusions 10b are shifted to engage the lateral sections of the grooves 2d, respectively, thereby allowing the first grip 3 to rotate up to an angular position, as shown in FIG. 3.

The second locking member holder 12 is made of a hollow cylinder and disposed between the first grip 3 and the retainer sleeve 2 in engagement of the tapered end 12a with the locking members 11, as will be described later in detail. The dampers 13 are disposed between the stopper ring 50 secured on the outer surface of the retainer sleeve 2 and en end of the second locking member holder 12 opposite the tapered end 12a. The dampers 13 are made of an elastically deformable material for absorbing the mechanical shock transmitted from the striker 15 to the tapered end 12a of the second locking member holder 12 through the tool bit 1 and the locking members 11. The tapered end 12a is oriented at a given angle to the direction in which the impact is transmitted from the striker 15 to the tool bit 1 in order to dispersing the impact transmitted to the locking members 11. The second locking member holder 12, as clearly shown in FIGS. 4 and 5, has also formed in the outer surface thereof diametrically opposed key seats 12d extending in a lengthwise direction thereof. The keys 3a formed on an inner wall of the first grip 3 are fitted into the key seats 12d of the second locking member holder 12 to lock relative rotation of the first grip 3 and the second locking member holder 12 while allowing relative movement in the axial direction.

Figure 7:
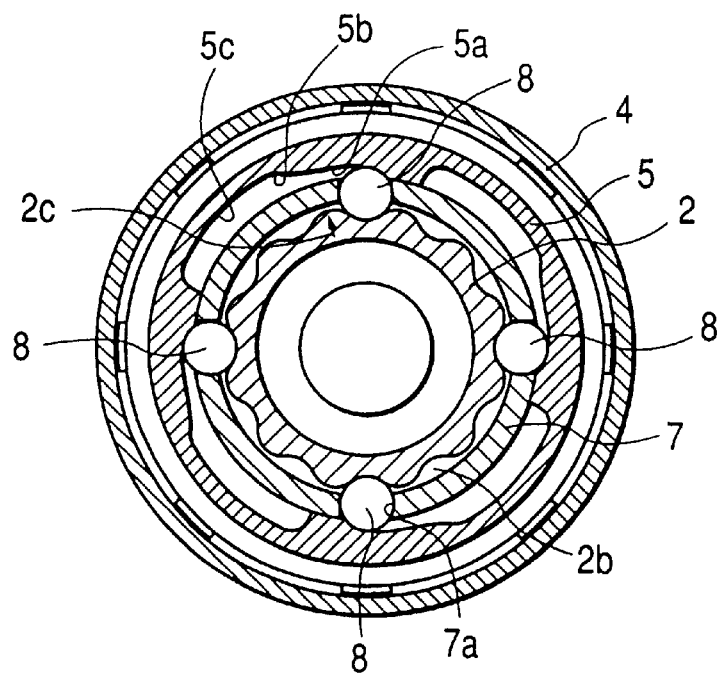
FIG. 7 is a traverse cross sectional view taken along the line VII—VII in FIG. 1.

The retainer sleeve 2, as clearly shown in FIG. 7, has formed on a rear end thereof a corrugated outer surface having twelve recesses 2b for defining twelve detent angular positions of the retainer sleeve 2 (i.e., the tool bit 1). The recesses 2b are arranged around the retainer sleeve 2 at regular intervals of 30°. The retainer sleeve 2 is inserted et the rear end thereof into the front cover 7 connected to the hammer casing 14 so as to be rotatable in a circumferential direction thereof. The front cover 7 has four holes 7a formed at regular intervals in a circumferential direction thereof. The steel balls 8 are disposed one in each hole 7a so as to be movable in a radial direction of the front cover 7 and surrounded by the ball holder 5 bonded to the second grip 4. The ball holder 5 is, as shown in FIG. 7, made of a hollow cylindrical member and has formed on an inner wall thereof a cam surface including stopper walls 5a, inclined walls 5b, and release walls 5c. The second coil spring 6 is connected at an end thereof to the ball holder 5 and the second grip 4 and at the other end to the front cover 7, thereby providing torsion to the ball holder 5 and the second grip 4 in a given rotational direction (a counterclockwise direction in FIG. 7). This brings the stopper walls 5a of the ball holder 5 into constant engagement with the steel balls 8, thereby holding the angular position of the retainer sleeve 2 relative to the front cover 7.

The ball holder 5, as shown in FIG. 1, has formed on the outer wall thereof the spring winding surface 5d around which the end of the first coil spring 9 is wound. The spring winding surface 5d ms slightly greater in diameter than the first coil spring 9 so that the first coil spring 9 is fixed on the ball holder 5 tightly by a clamping force thereof.

The removal of the tool bit 1 from the tool holding device will be described below with reference to FIGS. 1 to 4.

First, a user or operator pulls the first grip 3 backward (i.e., to the right in FIG. 1) against the spring pressure of the first coil spring 9 up to the position, as shown in FIG. 2, which movement causes the first locking member holder 10 to be moved backward so that the stopper walls 10a are shifted out of engagement with the locking members 11, as shown in FIG. 2. The second locking member holder 12, however, still engage the locking members 11 at the first inclined surfaces 12b, as clearly shown in FIG. 4, of the tapered end 12a to hold the locking members 11 from moving in the radial direction of the retainer sleeve 2.

Figure 4:
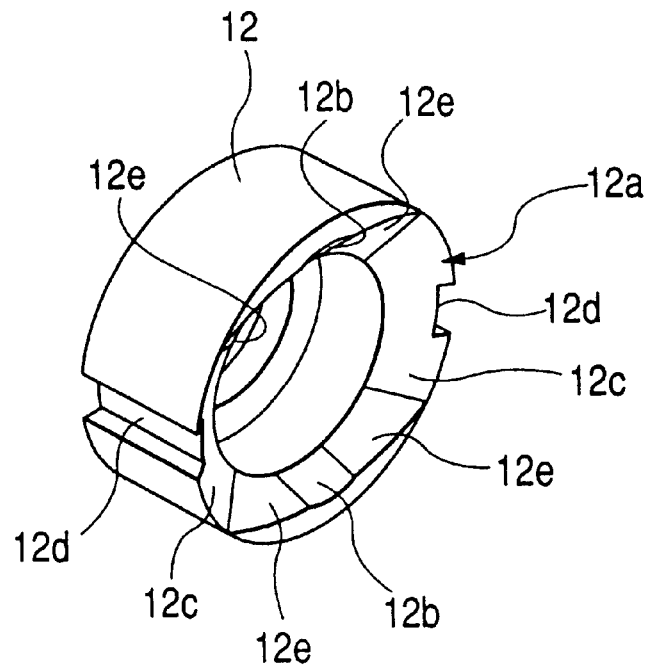
FIG. 4 is a perspective view which shows a second locking member holder.
Figure 5:
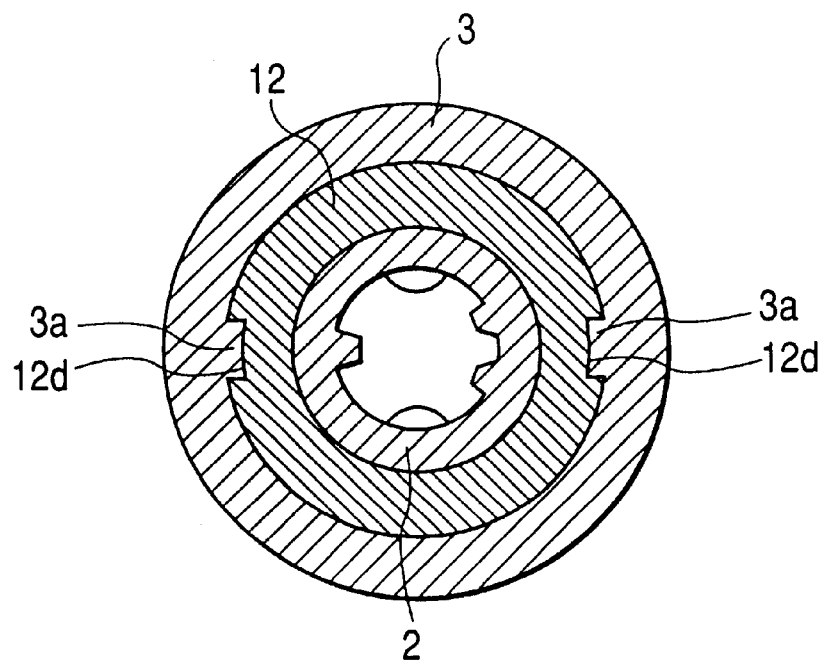
FIG. 5 is a traverse cross sectional view taken along the line V—V in FIG. 1.

Subsequently, the operator turns the first grip 3 from the angular position, as shown in FIG. 2, to the angular position, as shown in FIG. 3, which rotational movement, in turn, causes the second locking member holder 12 to be rotated through engagement of the keys 3a and the key seats 12d. The rotation of the second locking member holder 12 causes the first inclined surfaces 12b to be shifted out of engagement with the locking members 11, while it brings the second inclined surfaces 12c into engagement with the locking members 11, thereby allowing the locking members 11 to be moved outward out of engagement with the grooves 16 of the tool bit 1. This allows the operator to remove the tool bit 1 from the tool holding device. The first inclined surfaces 12b are, as can be seen in FIG. 4, diametrically opposed to each other and lead to the second inclined surfaces 12c through slopes 12e. Specifically, the first inclined surfaces 12b project from the second inclined surfaces 12c in a direction perpendicular to the second inclined surfaces 12c so that the length L1, as shown in FIG. 2, between the front end of the second locking member holder 12 and an inner edge of each of the first inclined surfaces 12b along the inner wall ms greater than the length L2, as shown in FIG. 3, between the front end of the second locking member holder 12 and an inner edge of each of the second inclined surfaces 12c along the inner wall.

When the first grip 3 is rotated to the angular position, as shown in FIG. 3, it will cause the first coil spring 9 to be rotated in a diameter-decreasing direction since the first coil spring 9 is, as described above, secured at one end thereof on the first locking member holder 10 and wound at the other end around the ball holder 5 so that it is tightened according to the rotation of the first grip 3. The rotation of the first grip 3, thus, causes the first coil spring 9 to be wound around the ball holder 5 more tightly so that the torsion acting in a direction opposite the rotation of the first grip 3 is accumulated in the first coil spring 9. Therefore, when the operator finishes removing the tool bit 1 from the tool holding device end releases the first grip 3, it will cause the torsion of the first coil spring 9 to act on the first locking member holder 10 to return the first grip 3 to the angular position, as shown in FIG. 1, automatically.

As described above, the removal of the tool bit 1 is accomplished by the two actions of drawing the first grip 3 backward and rotating the first grip 3 a given angle. This, therefore, prevents the tool bit 1 from being removed undesirably even if the operator pulls the first grip 3 backward accidentally.

The angular positioning of the tool bit 1 relative to the hammer casing 14 will be discussed below with reference to FIGS. 7 to 9.

The steel balls 8 disposed within the holes 7a of the front cover 7 are, as shown in FIG. 7, held from moving in the radial direction of the front cover 7 by the stopper walls 5a of the ball holder 5 so that they are seated on the recesses 2b to lock the retainer sleeve 2 and the hammer casing 14 together.

Figure 8:
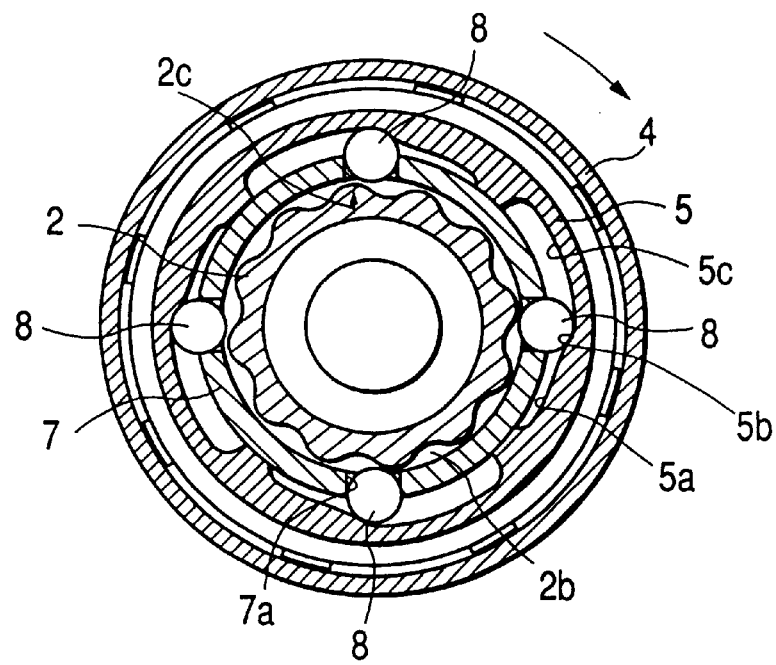
FIG. 8 is a traverse cross sectional view which shows a ball holder when rotated to bring inclined walls 5b thereof into engagement with steel balls.
Figure 9:
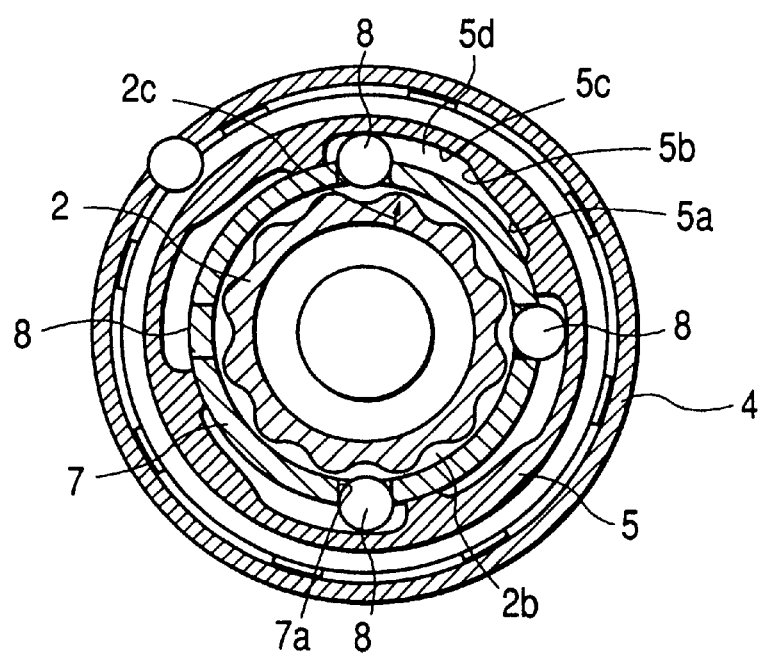
FIG. 9 is a traverse cross sectional view which shows a ball holder when rotated to bring release walls 5c thereof into engagement with steel balls.

When the operator rotates the second grip 4 in the clockwise direction, as viewed in FIG. 7, the ball holder 5 is also rotated in the clockwise direction so that the steel balls 8 are shifted from the stopper walls 5a to the inclined wall 5b, as shown in FIG. 8. When the steel balls 8 reach the inclined walls 5b, they are lifted away from the recesses 2b by protrusions on the corrugated surface of the retainer sleeve 2 rotating, as will be described later in detail, in the same direction as that of the ball holder 5. Further rotation of the second grip 4 causes the steel balls 8, as shown in FIG. 9, to enter chambers 5d defined by the release walls 5c and the periphery of the front cover 7, thereby allowing the steel balls 8 to be moved in the radial direction of the ball holder 5. Subsequently, when the operator releases the second grip 4, it will cause the second grip 4 to be returned automatically to the initial angular position, as shown in FIG. 7, by the torsion accumulated in the second coil spring 6 in the course of rotation from the angular position, as shown in FIG. 7, to the angular position, as shown in FIG. 9.

The first coil spring 9 is, as described above, wound around the spring winding surface 5d of the ball holder 5 so that it is tightened according to the rotation of the ball holder 5 from the angular position as shown in FIG. 7 to the angular position as shown in FIG. 8. The rotation of the second grip 4 in the clockwise direction, as viewed in the drawings, thus, causes the first coil spring 9 to be wound around the ball holder 5 more tightly so that the torsion is accumulated in the first coil spring 9 which acts on the second grip 4 to urge it in a direction opposite the rotation of the second grip 4. This torsion, as long as the operator holds the second grip 4, acts on the retainer sleeve 2 through the first locking member holder 10 and the first grip 3 to rotate the retainer sleeve 2 in the same direction as that of the rotation of the second grip 4 so that adjacent one of the recesses 2b is, as indicated by arrows 2c in FIGS. 8 and 9, moved into alignment with each of the steel balls 8. In practice, most of the torsion accumulated in the first coil spring 9 is consumed by the friction generated at O-rings disposed between the retainer sleeve 2 and the front cover 7 and the slippage of the first coil spring 8 when wound around the periphery of the ball holder 5 by the rotational movement of the second grip 4. Therefore, in this embodiment, the spring modulus of the first coil spring 9 or the friction factor of the O-rings is so adjusted that an approximately 65° rotation of the second grip 4 (i.e., the ball holder 5) from the angular position as shown in FIG. 7 to the angular position as shown in FIG. 9 results in an approximately 30° rotation of the retainer sleeve 2 (i.e., an angular interval between adjacent two of the recesses 2b). This allows the retainer sleeve 2 to be locked in increments of 30° relative to the front cover 7 (i.e., the hammer casing 14).

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is clammed is:

1. A holding device for holding a tool bit for use in a percussion apparatus comprising:

a tool bit carrier made of a hollow cylindrical member having a given length for carrying the tool bit therein along the length, said tool bit carrier having formed in a side wall thereof at least one opening;

at least one locking member disposed within the opening of said tool bit carrier;

a first locking member holder movable between a first holding position and a first release position in a lengthwise direction of said tool bit carrier, in the first holding position, said first locking member holder engaging a first portion of said locking member to establish engagement of said locking member with a groove formed in the tool bit for locking the tool bit in said tool bit carrier, in the first release position, said first locking member holder being placed out of engagement with the first portion of said locking member;

a second locking member holder movable between a second holding position and a second release position in a circumferential direction of said tool bit carrier, in the second holding position, said second locking member holder engaging a second portion of said locking member to establish engagement of said locking member with the groove of the tool bit for locking the tool bit in said tool bit carrier, in the second release position, said second locking member holder being placed out of engagement with the second portion of said locking member; and a hollow cylindrical grip provided around said tool bit carrier, connected to said first and second locking member holders, said hollow cylindrical grip being movable both in the lengthwise direction and in the circumferential direction of said tool bit carrier, movement in the lengthwise direction causing said first locking member holder to be moved from the first holding position to the first release position, movement in the circumferential direction causing said second locking member holder to be moved from the first holding position to the second release position, when said first and second locking member holders are placed in the first and second release positions, respectively, it will cause the engagement of said locking member with the groove of the tool bit to be released.

2. A holding device as set forth in claim 1, wherein said second locking member holder is disposed so as to surround a peripheral surface of said tool bit carrier and made of a hollow cylinder having formed on an end thereof a first tapered surface end e second tapered surface continuing from the first tapered surface, in the second holding position, said second locking member holder being placed in engagement of the first tapered surface with the second portion of said locking member to establish the engagement of said locking member with the groove of the tool bit, in the second release position, said second locking member holder being placed in engagement of the second tapered surface with the second portion of said locking member to release the engagement of said locking member with the groove of the tool bit.

3. A holding device as set forth in claim 2, wherein the first tapered surface of said second locking member holder projects from the second tapered surface in a direction perpendicular to the second tapered surface.

4. A holding device as set forth in claim 1, further comprising a spring urging said first locking member holder into the first holding position.

5. A holding device as set forth in claim 1, further comprising:
- a hollow cylindrical supporting member connected to the percussion apparatus, supporting therein an end portion of said tool bit carrier rotatably;
- a plurality of recesses formed in a circumferential surface of the end portion of said tool bit carrier at given angular intervals;
- at least one opening formed in a side wall of said hollow cylindrical supporting member in coincidence with one of said recesses;
- a second locking member disposed within said opening;
- a hollow cylindrical holder having formed on an inner wall a cam surface including a first and second section, said hollow cylindrical holder being supported on said hollow cylindrical supporting member rotatably so as to be movable between a first and second angular position, in the first angular position, the first section of the cam surface lying in engagement with said second locking member to bring said second locking member into constant engagement with first one of said recesses to determine a first angular relation between said tool bit carrier and said hollow cylindrical supporting member, in the second angular position, the second section of the cam surface defining a chamber within which said second locking member is allowed to be moved out of engagement with the one of said recesses; and
- rotating means for rotating said tool bit carrier relative to said hollow cylindrical supporting member according to movement of said hollow cylindrical holder from the first angular position to the second angular position to bring second one of said recesses adjacent said first one into coincidence with said second locking member for establishing a second angular relation between said tool bit carrier and said hollow cylindrical supporting member.

6. A holding device for holding a tool bit for use in a percussion apparatus comprising:
- a tool bit carrier made of a hollow cylindrical member for carrying the tool bit therein;
- a hollow cylindrical supporting member connected to the percussion apparatus, supporting therein an end portion of said tool bit carrier rotatably;
- a plurality of recesses formed in a circumferential surface of the end portion of said tool bit carrier at given angular intervals;
- at least one opening formed in a side wall of said hollow cylindrical supporting member in coincidence with one of said recesses;
- at least one locking member disposed within said opening;
- a hollow cylindrical holder having formed on an inner wall a cam surface including a first and second section, said hollow cylindrical holder being supported on said hollow cylindrical supporting member rotatably so as to be movable between a first and second angular position, in the first angular position, the first section of the cam surface lying in engagement with said locking member to bring said locking member into constant engagement with first one of said recesses to determine e first angular relation between said tool bit carrier and said hollow cylindrical supporting member, in the second angular position, the second section of the cam surface defining a chamber within which said locking member is allowed to be moved out of engagement with the one of said recesses; and
- rotating means for rotating said tool bit carrier relative to said hollow cylindrical supporting member according to movement of said hollow cylindrical holder from the first angular position to the second angular position to bring second one of said recesses adjacent said first one into coincidence with said locking member for establishing a second angular relation between said tool bit carrier and said hollow cylindrical supporting member.

7. A holding device as set forth in claim 6, wherein said rotating means includes a spring connected at one end to said tool bit carrier and wound at the other end around said hollow cylindrical holder, the spring transmitting torsion, produced by the movement of said hollow cylindrical holder from the first angular position to the second angular position, to said tool bit carrier.

8. A holding device as set forth in claim 7, further comprising a hand-operated grip made of a hollow cylinder having disposed therein said hollow cylindrical holder, said hand-operated grip being connected to said hollow cylindrical holder so as to be rotatable together.

9. A holding device as set forth in claim 7, further comprising a second spring producing a spring pressure according to the movement of said hollow cylindrical holder from the first angular position to the second angular position to urge said hollow cylindrical holder in a direction opposite the movement thereof.

* * * * *

UNITED STATES PATENT AND TRADEMARK OFFICE
CERTIFICATE OF CORRRECTION

PATENT NO. : 5,971,403
DATED : October 26, 1999
INVENTOR(S) : Akihisa Yahagi, et al.

It is certified that error appears in the above-identified patent and that said Letters Patent is hereby corrected as shown below:

On the title page, Item [56] insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 4 | 6 | 2 | 6 | 1 | 4 | 6 | 12/02/1986 | Neumaier | 408 | 239R | |
| | | | | | | | | | | | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | G | 93 | 05 | 0 | 3 | 4 | U1 | 09/15/1994 | GERMANY | | | X | |
| | | GB | 2 | 276 | 579 | A | | 10/05/1994 | UNITED KINGDOM | | | | |

Signed and Sealed this

Sixteenth Day of May, 2000

*Attest:*

Q. TODD DICKINSON

*Attesting Officer*          *Director of Patents and Trademarks*